US011279043B2

(12) United States Patent
Zhang

(10) Patent No.: US 11,279,043 B2
(45) Date of Patent: Mar. 22, 2022

(54) ELECTRONIC GUIDE DOG

(71) Applicant: Junyi Zhang, Tianjin (CN)

(72) Inventor: Junyi Zhang, Tianjin (CN)

( * ) Notice: Subject to any disclaimer, the term of this patent is extended or adjusted under 35 U.S.C. 154(b) by 192 days.

(21) Appl. No.: 16/808,389

(22) Filed: Mar. 4, 2020

(65) Prior Publication Data

US 2020/0215697 A1 Jul. 9, 2020

(30) Foreign Application Priority Data

Dec. 24, 2019 (CN) ......................... 201911345755.4
Dec. 24, 2019 (CN) ......................... 201922343213.5

(51) Int. Cl.

*B25J 19/00* (2006.01)
*B25J 11/00* (2006.01)
*B25J 5/00* (2006.01)
*B25J 13/08* (2006.01)
*B25J 19/02* (2006.01)

(52) U.S. Cl.

CPC ............. *B25J 11/008* (2013.01); *B25J 5/007* (2013.01); *B25J 13/081* (2013.01); *B25J 19/023* (2013.01); *B25J 19/005* (2013.01)

(58) Field of Classification Search

CPC ...... B25J 19/023; B25J 13/081; B25J 11/008; B25J 5/007; B25J 19/005; B25J 9/1694; B25J 19/00; B25J 9/0093; B25J 9/162; B25J 9/163; B25J 5/00; B25J 9/1687; B25J 19/021; B25J 9/1671; B25J 9/1612; B25J 9/1697; B62D 57/024; B65G 47/50

See application file for complete search history.

(56) References Cited

U.S. PATENT DOCUMENTS 6,263,989 B1 * 7/2001 Won ......................... B25J 5/005 180/8.7
9,233,470 B1 * 1/2016 Bradski .................. B25J 9/1671
10,455,212 B1 * 10/2019 Konolige ............. H04N 13/122
2006/0254840 A1 * 11/2006 Strong ..................... B60G 7/02 180/190
2008/0116665 A1 * 5/2008 Nakaizumi .............. B62K 5/01 280/638

(Continued)

OTHER PUBLICATIONS

Moazzam et al. Design and construction of mobility assistive hybrid automobile for impaired persons, 2016, IEEE, p. 150-154 (Year: 2016).*

(Continued)

*Primary Examiner* — Mcdieunel Marc

(57) ABSTRACT

An electronic guide dog includes: a main frame, front drive wheels disposed on both sides of a front portion of the main frame, and rear drive wheels disposed on both sides of a rear portion of the main frame, wherein the front drive wheels and the rear drive wheels are connected to the main frame through front arms and rear arms, respectively; wherein the electronic guide dog further comprises: a head frame hinged to a front of a top end of the main frame, wherein a signal receiving board is provided on the head frame; a drive mechanism comprising a rear drive motor; a swivel obstacle avoidance mechanism comprising an infrared sensor provided on a front side of the main frame, a left front drive motor and a right front drive motor; an identification braking mechanism; a front arm swing mechanism; and an auxiliary support mechanism.

20 Claims, 6 Drawing Sheets

(56) References Cited

U.S. PATENT DOCUMENTS

2010/0147615 A1* 6/2010 Tsujii .................... B62M 17/00
180/215
2014/0138167 A1* 5/2014 Bebernes .............. B62D 5/093
180/6.48

OTHER PUBLICATIONS

Castelli-Dezza et al., Design and realization of a quadricycle for urban mobility, 2014, IEEE, p. 1-8 (Year: 2014).*
Yin et al., Development of ray nondestructive detecting and grinding robot for weld seam in pipe, 2017, IEEE, p. 208-214 (Year: 2017).*
Tomaszuk et al., Active wheel speed control to avoid lifting the swingarms in rocker-bogie suspension, 2019, IEEE, p. 30-39 (Year: 2019).*

* cited by examiner

ELECTRONIC GUIDE DOG

CROSS REFERENCE OF RELATED APPLICATION

The present invention claims priority under 35 U.S.C. 119(a-d) to CN 201922343213.5, filed Dec. 24, 2019 and CN 201911345755.4, filed Dec. 24, 2019.

BACKGROUND OF THE PRESENT INVENTION

Field of Invention

The present invention relates to a technical field of intelligent guide for the blind, and more particularly to an electronic guide dog.

Description of Related Arts

Living guide dogs have always been controversial in every corner of the world, especially for people who are afraid of dogs, no matter how small or docile the dogs are. In some specific occasions and environments, there will be sounds such as "guide dogs are not allowed". Although such sound is rare, it also inhibits the blind from normally enjoy more life experience. With the advent of the intelligent era, a lot of attempts have been made to study the characteristics, gait, habits, and functions of living guide dogs in detail. After various integration and optimization, the guide dogs have managed to be concise, dexterous, and low cost, which are intelligent and able to guiding the blind. However, the conventional intelligent guide dogs can only perform line tracking and infrared obstacle avoidance. There is still no breakthrough in traffic light recognition and free stair climb.

Therefore, based on the above issues, it is of great practical significance to provide an electronic guide dog that provides a better life experience for the blind.

SUMMARY OF THE PRESENT INVENTION

To overcome the above issues in the prior art, the present invention provides an electronic guide dog that provides a better life experience for the blind.

Accordingly, in order to accomplish the above objects, the present invention provides:

an electronic guide dog, comprising: a main frame, front drive wheels disposed on both sides of a front portion of the main frame, and rear drive wheels disposed on both sides of a rear portion of the main frame, wherein the front drive wheels and the rear drive wheels are connected to the main frame through front arms and rear arms, respectively; wherein the electronic guide dog further comprises:

a head frame hinged to a front of a top end of the main frame, wherein a signal receiving board is provided on the head frame;

a drive mechanism comprising a rear drive motor for driving the rear drive wheels;

a swivel obstacle avoidance mechanism comprising an infrared sensor provided on a front side of the main frame, and a left front drive motor and a right front drive motor for driving the front drive wheels;

an identification braking mechanism comprising a color sensor provided at a bottom end of the main frame;

a front arm swing mechanism comprising two front arm drive motors for adjusting inclination angles of the two front arms; and an auxiliary support mechanism comprising an auxiliary arm mounted on a rear side of the main frame, an auxiliary wheel rotatably mounted on the auxiliary arm, and auxiliary arm drive motors for adjusting an inclination angle of the auxiliary arm.

Preferably, a control box and a dot matrix board are provided on the front and a rear of the top end of the main frame, respectively; a CPU controller is provided inside the control box; an assembly bar is vertically provided at a front end of the main frame; a melody board is provided at the bottom end of the main frame; an assembly board and a solar photovoltaic panel are installed on both a left side and a right side of the main frame, and the assembly board is in front of the solar photovoltaic panel; a battery charging controller and a battery are provided inside the main frame.

Preferably, the electronic guide dog further comprises a movable handle hinged on both sides of the main frame, wherein the movable handle has a gantry frame structure; the movable handle crosses the main frame, and two free ends of the movable handle are rotatably connected to the assembly board on the left side and the assembly board on the right side of the main body, respectively; the movable handle is also equipped with a touch sensor.

Preferably, assembly holes are drilled on the assembly bar, the assembly board, the movable handle, the front arms and the auxiliary arm.

Preferably, the infrared sensor is mounted on a sensor installing board, and the sensor installing board is mounted on the assembly holes of the assembly bar by bolts.

Preferably, the front drive wheels are rotatably mounted on bottom portions of the front arms; the front drive motors, which are drivingly connected to the front drive wheels, are provided at the bottom portions of the front arms. Top portions of the front arms are rotatably installed on the assembly boards through connecting members, the front arm drive motors, which are drivingly connected to the connecting members, are provided at the front side of the main frame.

Preferably, the rear drive wheels are rotatably mounted on bottom portions of the rear arms; the rear drive motors, which are drivingly connected to the rear drive wheels, are provided at the bottom portions of the rear arms. Top portions of the rear arms are fixed to the bottom end of the main frame.

Preferably, each of the front drive wheels and the rear drive wheels comprises a wheel frame and a tire, wherein the tire is a rubber tire with tooth marks; the front drive motor and the rear drive motor are DC motors; the front arm drive motor and the auxiliary arm drive motor are servo motors.

Preferably, the auxiliary arm is formed by a pair of single arms arranged in parallel; a pair of the auxiliary arm drive motors are symmetrically arranged on the rear side of the main frame, and the two auxiliary arm drive motors are drivingly connected to ends of the two single arms, respectively; the auxiliary wheel is formed by a pair of single wheels arranged in parallel, and the two single wheels are connected by a connecting shaft; the connecting shaft is rotatably installed at an end of the auxiliary arm away from the main frame.

Preferably, the head frame is a frame structure assembled by at least four boards; a signal receiver is mounted on the signal receiving board; at least one LED light is provided on a front side of the head frame, and a protective frame covers the LED light; tilt sensors are installed on both sides of the head frame.

Preferably, the top end of the main frame is further provided with a head drive motor for adjusting an inclination angle of the head frame, and the head drive motor is drivingly connected to the head frame. An axis of a motor shaft of the head drive motor coincides with an axis of a hinge shaft of the head frame.

Preferably, a micro camera is provided on the head frame, and a storage device is provided inside the control box.

Preferably, the electronic guide dog further comprises: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

Advantages and positive effects of the present invention are as follows.

1. In the present invention, two rear drive wheels are driven by the rear drive motors and two front drive wheels are driven by the left front drive motor and the right front drive motor, in such a manner that the electronic guide dog walks straight, which is easy to operate and highly practical.

2. In the present invention, the infrared sensor can sense and avoid obstacles ahead. For avoiding obstacles, the electronic guide dog first brakes and lays down, and then swivels in an orderly manner, thereby providing better life experience for the blind.

3. In the present invention, the swivel movement is achieved through the linkage of two rear drive motors, the left front drive motor, and the right front drive motor. Steering and speed difference of the motors is used to realize steering of electronic guide dog, which is easy to operate and highly practical.

4. In the present invention, when the electronic guide dog goes upstairs, the front arms are first adjusted by the front arm swing mechanism to tilt upward, so that the front drive wheels contact an edge of a next step; then the front drive wheels are driven by the left front drive motor and the right front drive motor to move to the next step; and then the rear drive wheels are lifted from the ground by the auxiliary support mechanism before moving to the next step. Going upstairs step by step through repeating the above steps realizes a stair climb function, thereby providing better life experience for the blind.

5. In the present invention, the solar photovoltaic panels are installed on the left side and the right side of the main frame; which collect solar energy in the environment and convert it into electrical energy to reduce emissions and save energy.

6. In the present invention, the movable handle can be rotated on the assembly boards of the main frame, and a guide rope can be connected to the movable handle. The user can also hold the movable handle to lift the electronic guide dog, which is easy to operate.

7. In the present invention, two auxiliary arm drive motors synchronically rotate the auxiliary arm to prevent instability of the auxiliary arm, and improve stability of the auxiliary arm.

8. In the present invention, the auxiliary wheel is formed by a pair of the single wheels arranged in parallel, which improves operation stability. The auxiliary wheel can also keep the electronic guide dog balanced and avoid rolling over on uneven ground.

9. In the present invention, when the electronic guide dog passes the starting position of the crosswalk, the color sensor at the bottom end of the main frame can recognize the color of the red indicator lights on the ground, and keeps the electronic guide dog in a braking state. When the traffic light is in green, the electronic guide dog will be in a forward state. The color-changing indicator strip is set to control a moving state of the electronic guide dog, thereby greatly improving safety when the blind crosses the road.

BRIEF DESCRIPTION OF THE DRAWINGS

The technical solution of the present invention will be further described in detail below with reference to the accompanying drawings and embodiments.

Figure 1:
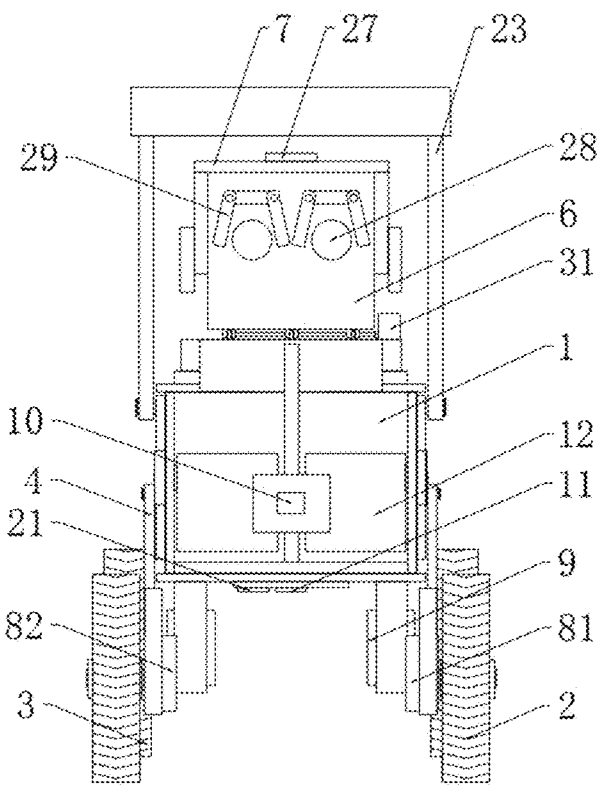
FIG. 1 is a front view of an embodiment 1 of the present invention.
Figure 2:
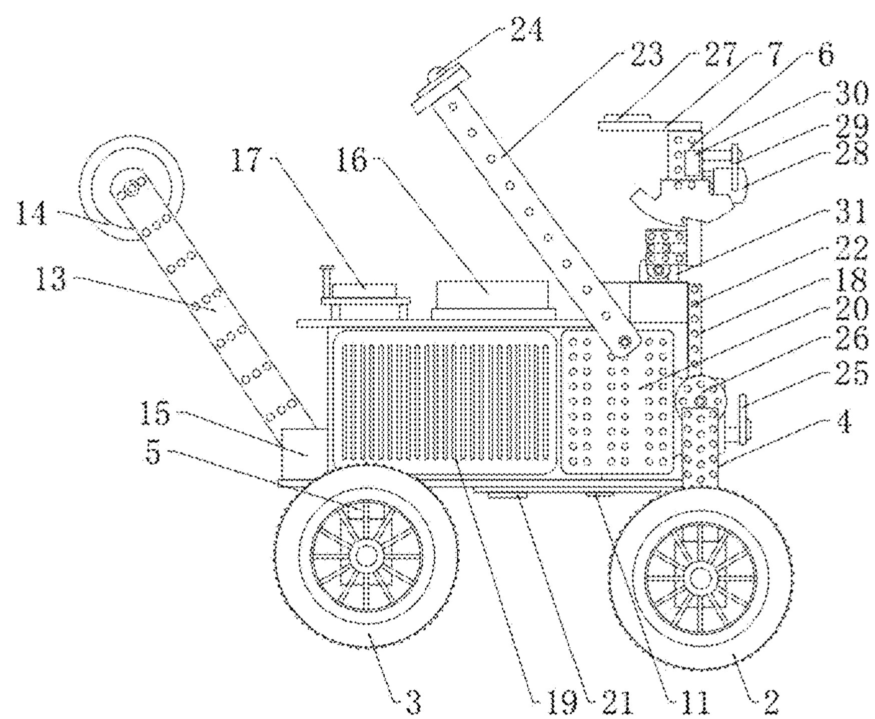
FIG. 2 is a left of the embodiment 1 of the present invention.
Figure 3:
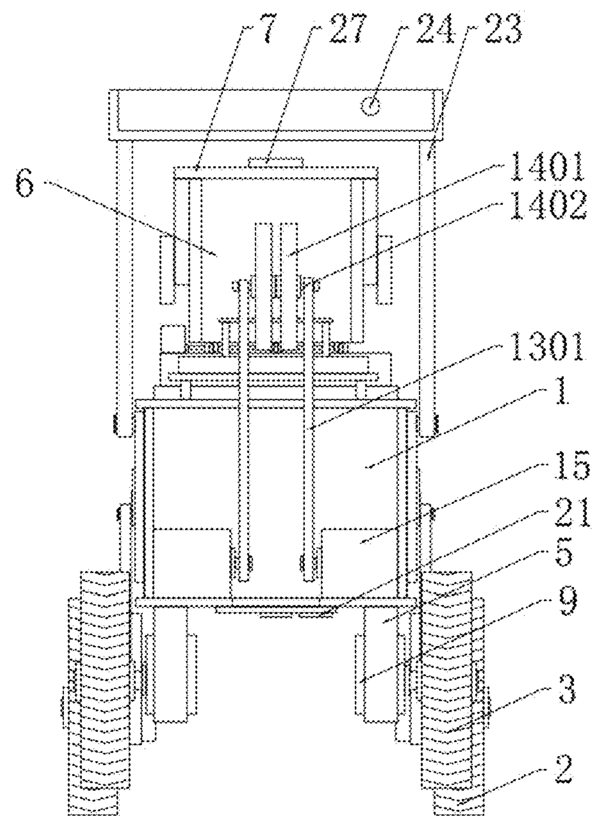
FIG. 3 is a rear view of the embodiment 1 of the present invention.
Figure 4:
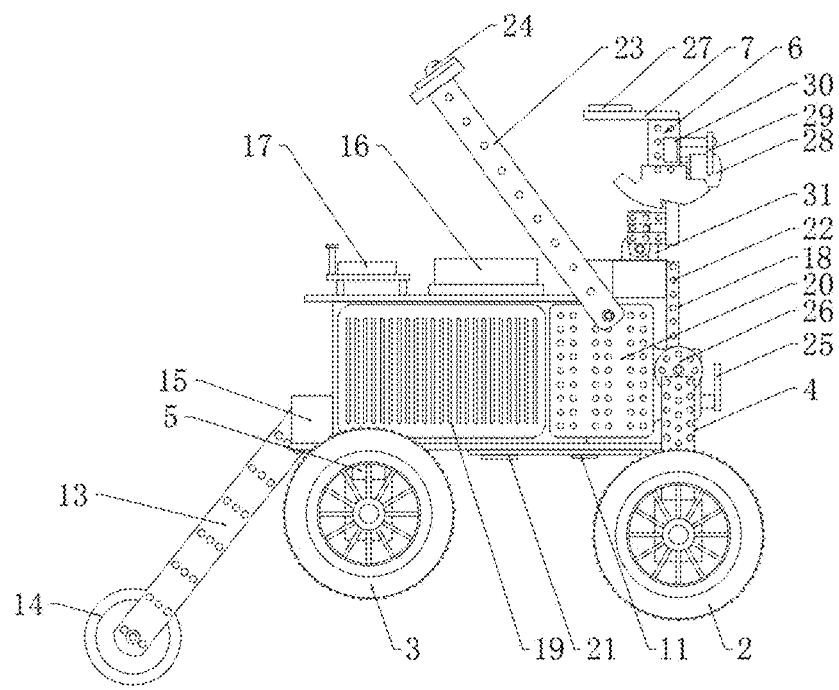
FIG. 4 is a structural view of an auxiliary supporting mechanism when an auxiliary arm in a supporting state.
Figure 5:
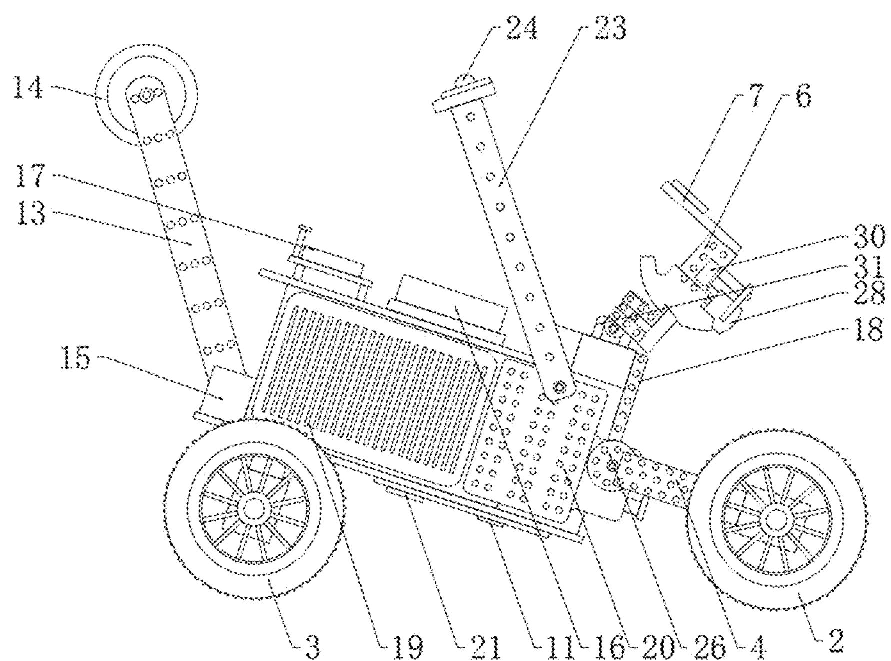
FIG. 5 is a structural view of the present invention in a braking and lying down state.

Element reference: 1—main frame, 2—front drive wheel, 3—rear drive wheel, 4—front arm, 5—rear arm, 6—head frame, 7—signal receiving board, 81—left front drive motor, 82—right front drive motor, 9—rear drive motor, 11—color sensor, 12—front arm drive motor, 13—auxiliary arm, 1301—single arm, 14—auxiliary wheel, 1401—single wheel, 1402—connecting shaft, 15—auxiliary arm drive motor, 16—control box, 17—dot matrix board, 18—assembly bar, 19—solar photovoltaic panel, 20—assembly board, 21—melody board, 22—assembly hole, 23—movable handle, 24—touch sensor, 25—sensor installing board; 26—connecting member, 27—signal receiver, 28—LED light, 29—protective frame, 30—tilt sensor, 31—head drive motor, 32—micro camera, 33—color-changing indicator strip, 34—traffic light.

DETAILED DESCRIPTION OF THE PREFERRED EMBODIMENT

Referring to FIGS. 1-8 of the drawings, the present invention will be further illustrated.

Embodiment 1

Referring to FIGS. 1-6, an electronic guide dog comprises: a main frame 1, front drive wheels 2 disposed on both sides of a front portion of the main frame 1, and rear drive wheels 3 disposed on both sides of a rear portion of the main frame 1, wherein the front drive wheels 2 and the rear drive wheels 3 are connected to the main frame 1 through front arms 4 and rear arms 5, respectively; wherein the electronic guide dog further comprises: a head frame 6 hinged to a front of a top end of the main frame 1, wherein a signal receiving board 7 is provided on the head frame 6; a drive mechanism comprising a rear drive motor 9 for driving the rear drive wheels 3; a swivel obstacle avoidance mechanism comprising an infrared sensor 10 provided on a front side of the main frame 1, and a left front drive motor 81 and a right front drive motor 82 for driving the front drive wheels 2; an identification braking mechanism comprising a color sensor 11 provided at a bottom end of the main frame 1; a front arm swing mechanism comprising two front arm drive motors 12 for adjusting inclination angles of the two front arms 4; and an auxiliary support mechanism comprising an auxiliary arm 13 mounted on a rear side of the main frame 1, an auxiliary wheel 14 rotatably mounted on the auxiliary arm 13, and auxiliary arm drive motors 15 for adjusting an inclination angle of the auxiliary arm 13.

Figure 6:
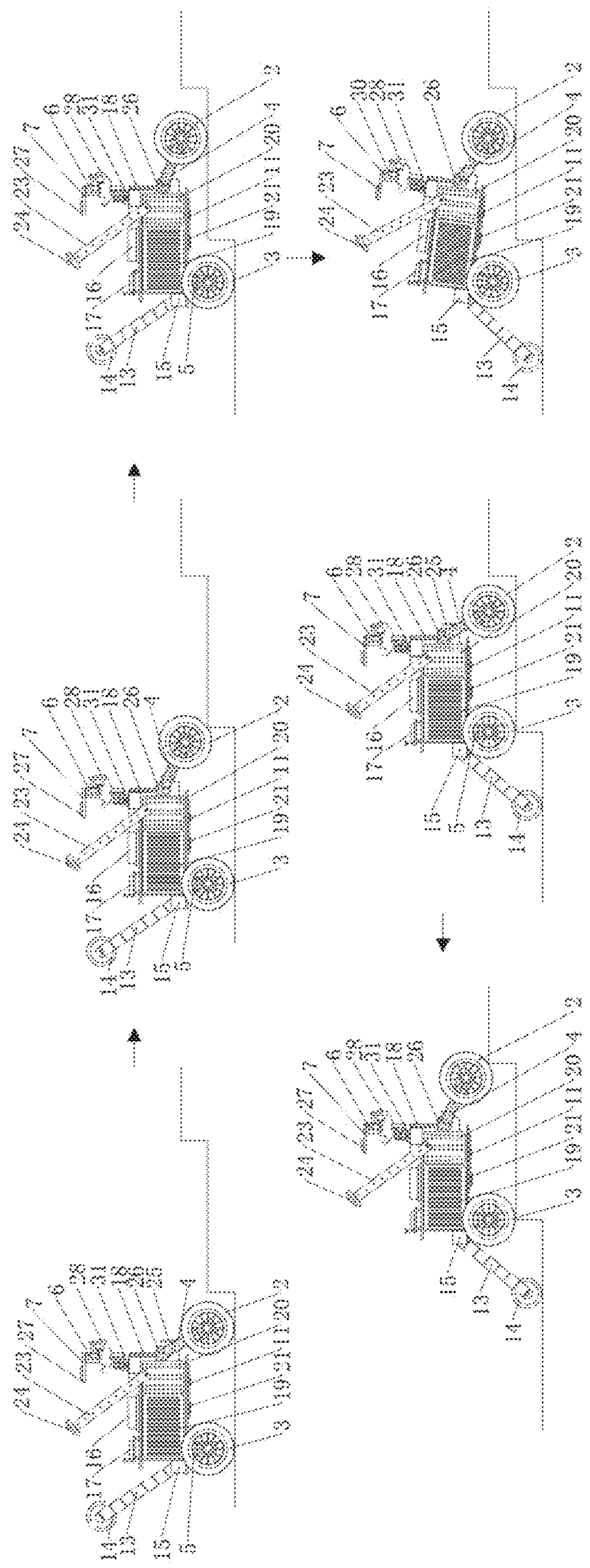
FIG. 6 is a flowchart of stair climbing according to the present invention.

Working principles are as follows. According to the embodiment 1, the electronic guide dog can guide the blind to walk. A guide rope may be connected to the main frame 1 of the electronic guide dog. Two rear drive wheels 3 are driven by the rear drive motors of the drive mechanism and two front drive wheels 2 are driven by the left front drive motor 81 and the right front drive motor 82 of the swivel obstacle avoidance mechanism, in such a manner that the electronic guide dog walks straight. The signal receiving board 7 is provided on the head frame 6 for receiving external signals, and the infrared sensor is provided in the front of the main frame 1 to sense and avoid obstacles ahead. For avoiding obstacles, the electronic guide dog first brakes and lays down, and then swivels in an orderly manner; thereby providing better life experience for the blind. When the electronic guide dog lays down, as shown in the FIG. 5, the two front arms 4 are tilted up by the front arm drive motors 12. For restoring, the two front arms 4 are tilted down by the front arm drive motors 12. Swivel movement is achieved through the linkage of two rear drive motors 9, the left front drive motor 81, and the right front drive motor 82. For turning right, both the left front drive motor 81 and the rear drive motor 9 on the left rotate forward, and both the right front drive motor 82 and the rear drive motor 9 on the right rotate backward, which uses steering and speed difference of the motors to realize steering of electronic guide dog. Turning left is similar, which is easy to operate and highly practical. When the electronic guide dog goes upstairs, as shown in FIG. 6, the front arms 4 are first adjusted by the front arm drive motors 12 to tilt upward, so that the front drive wheels 2 contact an edge of a next step; then the front drive wheels 2 are driven by the left front drive motor 81 and the right front drive motor 82 to move to the next step; and then the auxiliary arm 13 is tilted downward by the auxiliary arm drive motor 15 to act like a lever, in such a manner that the rear drive wheels 3 are lifted from the ground; the left front drive motor 81 and the right front drive motor 82 move the two front drive wheels 2 forwards until the rear drive wheels 3 move to the next step; finally, the auxiliary arm drive motor 15 restores the auxiliary arm 13 to complete the step. Going upstairs step by step through repeating the above steps realizes a stair climb function, thereby providing better life experience for the blind.

Preferably, according to the embodiment 1, a control box 16 and a dot matrix board 17 are provided on the front and a rear of the top end of the main frame 1, respectively; a CPU controller is provided inside the control box 16; an assembly bar 18 is vertically provided at a front end of the main frame 1; a melody board 21 is provided at the bottom end of the main frame 1; an assembly board 20 and a solar photovoltaic panel 19 are installed on both a left side and a right side of the main frame 1, and the assembly board 20 is in front of the solar photovoltaic panel 19; a battery charging controller and a battery are provided inside the main frame 1. Identification information of the electronic guide dog can be scrolled on the dot board 17 to facilitate the identification of strangers. The melody board 21 emits a prompt sound when it encounters an obstacle or a red light, which is convenient for the user to identify. The solar photovoltaic cell panels 19 are installed on the left and right sides of the main frame 1. It should be noted that the solar photovoltaic cell panel can be, but is not to, a polycrystalline silicon photovoltaic cell panel.

Preferably, according to the embodiment 1, the electronic guide dog further comprises a movable handle 23 hinged on both sides of the main frame 1, wherein the movable handle 23 has a gantry frame structure; the movable handle 23 crosses the main frame 1, and two free ends of the movable handle 23 are rotatably connected to the assembly board 20 on the left side and the assembly board 20 on the right side of the main body 1; respectively; the movable handle 23 is also equipped with a touch sensor 24. The movable handle 23 can be rotated on the assembly boards 20 of the main frame 1, and a guide rope can be connected to the movable handle 23. The user can also hold the movable handle 23 to lift the electronic guide dog, which is easy to operate. For climbing stairs, the stair climbing function of the electronic guide dog can be triggered by push the touch sensor 24.

Preferably, according to the embodiment 1, assembly holes 22 are drilled on the assembly bar 18, the assembly board 20, the movable handle 23, the front arms 4 and the auxiliary arm 13.

Preferably, according to the embodiment 1, the infrared sensor 10 is mounted on a sensor installing board 25, and the sensor installing board 25 is mounted on the assembly holes 22 of the assembly bar 18 by bolts. The infrared sensor 10 can be bolted to the assembly holes 22 at different heights of the assembly bar 18 according to actual needs, so as to adjust a height of the infrared sensor 10, which is easy to operate.

Preferably, according to the embodiment 1, the front drive wheels 2 are rotatably mounted on bottom portions of the front arms 4; the front drive motors, which are drivingly connected to the front drive wheels 2, are provided at the bottom portions of the front arms 4. Top portions of the front arms 4 are rotatably installed on the assembly boards 20 through connecting members 26, the front arm drive motors 12, which are drivingly connected to the connecting members 26, are provided at the front side of the main frame 1. The front arm driving motors 12 can drive the connecting members 26 to rotate on the assembly boards 20. Since the top portions of the front arms 4 are fixed to the connecting members 26, the inclination angles of the front arms 4 can be adjusted; wherein a transmission connection can be, but not limited to, direct connection to a motor shaft of the motor, engaged gears and engaged chains.

Preferably, according to the embodiment 1, the rear drive wheels 3 are rotatably mounted on bottom portions of the rear arms 5; the rear drive motors 9, which are drivingly connected to the rear drive wheels 3, are provided at the bottom portions of the rear arms 5. Top portions of the rear arms 5 are fixed to the bottom end of the main frame 1.

Preferably, according to the embodiment 1, each of the front drive wheels 2 and the rear drive wheels 3 comprises a wheel frame and a tire, wherein the tire is a rubber tire with tooth marks to resist sliding; the front drive motor and the rear drive motor 9 are DC motors with a steering angle of 360° for driving forwards or backwards; the front arm drive motor 12 and the auxiliary arm drive motor 15 are servo motors with a rotating angle of 1°-214°. The servo motor is stable with controllable degree of freedom, and it can be fixed at required angles through programming. For example, the braking and laying down movement of the front arms of the electronic guide dog is achieved by programming the servo motor, so as to fix the servo motor to a specific angle.

Preferably, according to the embodiment 1; the auxiliary arm 13 is formed by a pair of single arms 1301 arranged in parallel; a pair of the auxiliary arm drive motors 15 are symmetrically arranged on the rear side of the main frame 1; and the two auxiliary arm drive motors 15 are drivingly connected to ends of the two single arms 1301, respectively; the auxiliary wheel 14 is formed by a pair of single wheels 1401 arranged in parallel, and the two single wheels 1401 are connected by a connecting shaft 1402; the connecting shaft 1402 is rotatably installed at an end of the auxiliary arm 13 away from the main frame 1. The two auxiliary arm drive motors 15 are drivingly connected to the ends of the two single arms 1301, and the two single arms 1301 are arranged in parallel to form the auxiliary arm 13, which means two auxiliary arm drive motors 15 synchronically rotate the auxiliary arm 13 to prevent instability of the auxiliary arm 13, and improve stability of the auxiliary arm 13. The auxiliary arm 13 is tilted downward by the auxiliary arm drive motor 15 to act like a lever, in such a manner that the rear drive wheels 3 are lifted from the ground; then the front drive wheels 2 move forwards or backwards and the auxiliary wheel 14 moves instead of the rear drive wheels 3 to stabilize the electronic guide dog. The auxiliary wheel 14 is formed by a pair of single wheels 1401 arranged in parallel, which improves operation stability. The auxiliary wheel 14 can also keep the electronic guide dog balanced and avoid rolling over on uneven ground.

Preferably, according to the embodiment 1, the head frame 6 is a frame structure assembled by at least four boards; a signal receiver 27 is mounted on the signal receiving board 7; at least one LED light 28 is provided on a front side of the head frame 6, and a protective frame 29 covers the LED light 28; tilt sensors 30 are installed on both sides of the head frame 6. The LED light 28 may be, but is not limited to, an RGB LED light; which is located on a head of the electronic guide dog. A color indicator indicates a working state of the electronic guide dog. The tilt sensors 30 are located on the head of the electronic guide dog for balancing.

Preferably, according to the embodiment 1; the top end of the main frame 1 is further provided with a head drive motor 31 for adjusting an inclination angle of the head frame 6; and the head drive motor 31 is drivingly connected to the head frame 6. An axis of a motor shaft of the head drive motor 31 coincides with an axis of a hinge shaft of the head frame 6. When the electronic guide dog brakes and lays down, the head drive motor 31 drives the head frame 6 to lower down.

Embodiment 2

Figure 7:
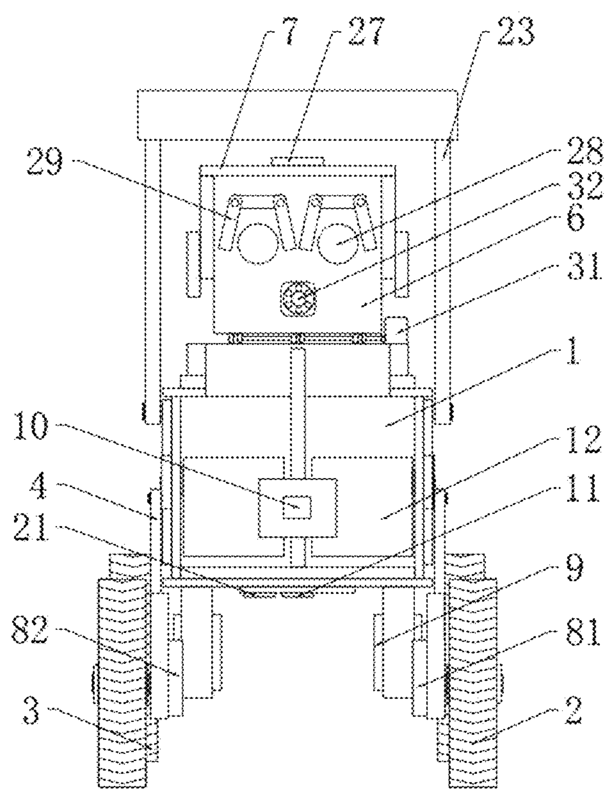
FIG. 7 is a structural view of an embodiment 2 of the present invention when cooperating with a traffic light.

Based on the embodiment 1, the embodiment 2 further improves the present invention. Referring to FIG. 7; a micro camera 32 is provided on the head frame 6 to record and identify scenes experienced by the electronic guide dog. A storage device is provided inside the control box 16 for storing information. The micro camera 32 is electrically connected to the storage device through the CPU controller, and content recorded by the micro camera 32 is transmitted to and stored in the storage device through the CPU controller.

Embodiment 3

Figure 8:
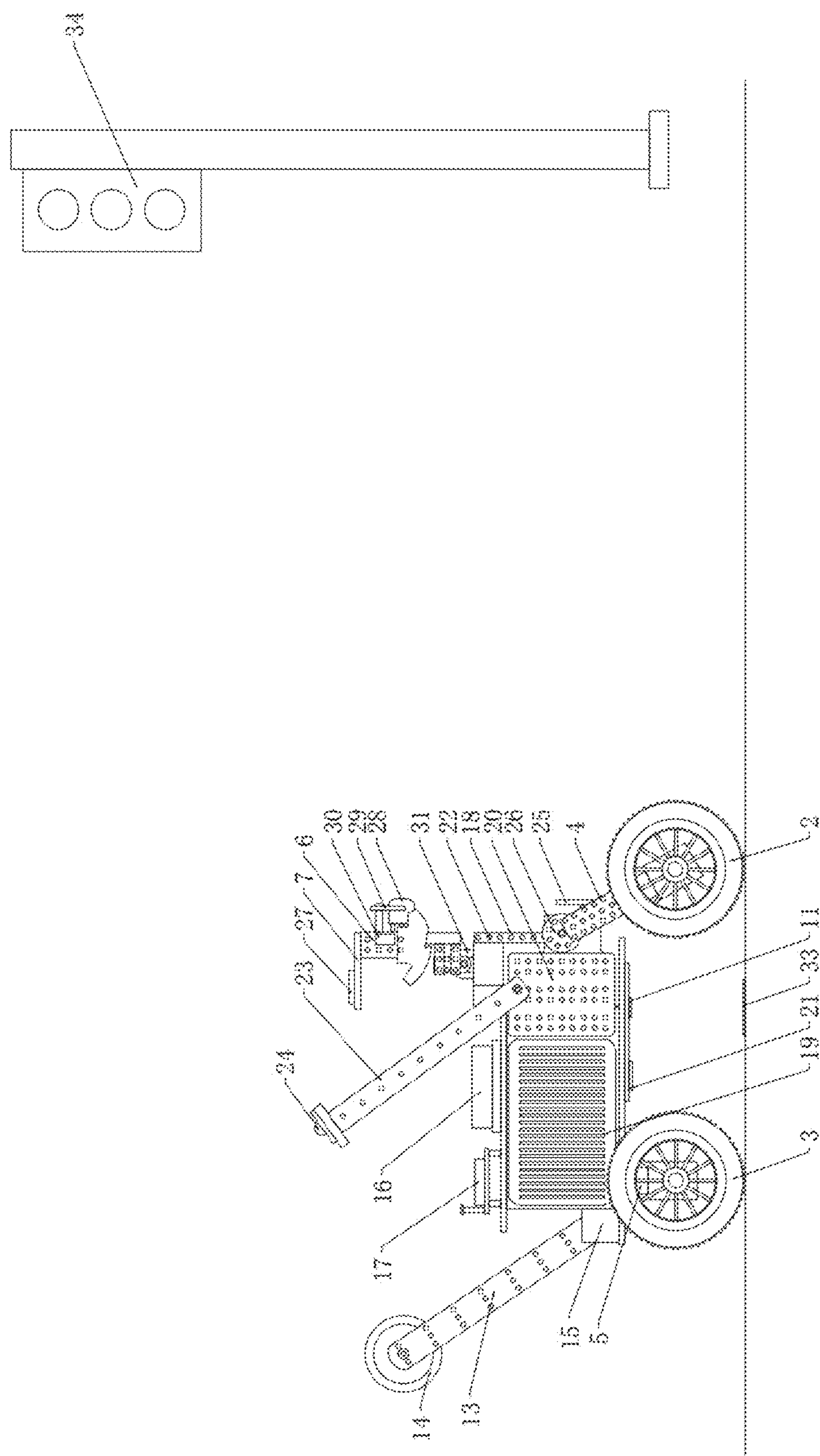
FIG. 8 is a structural view of an embodiment 3 of the present invention.

Based on the embodiment 1 or 2, the embodiment 23 further improves the present invention. Referring to FIG. 8, the electronic guide dog further comprises: a color-changing indicator strip 33 which attached to a ground surface and is located at a starting position of a crosswalk, wherein the color-changing indicator strip 33 is a light indicator strip with red indicator lights uniformly distributed therein; the red indicator lights flash synchronously with a red signal light in the traffic light 34.

To further improve safety instructions for the blind people at the crosswalk, the color-changing indicator strip 33 is attached to the starting position of the crosswalk, wherein the color-changing indicator strip 33 is the light indicator strip with the red indicator lights uniformly distributed therein; the red indicator lights flash synchronously with the red signal light in the traffic light 34. When the traffic light 34 is in red, the red indicator lights flash. When the electronic guide dog passes the starting position of the crosswalk, the color sensor 11 at the bottom end of the main frame 1 can recognize the color of the red indicator lights on the ground, and keeps the electronic guide dog in a braking state. When the traffic light 34 is in green, the red indicator lights are turned off the electronic guide dog will be in a forward state. The color-changing indicator strip 33 is set to control a moving state of the electronic guide dog, thereby greatly improving safety when the blind crosses the road.

Preferably, according to the embodiment 1, 2 or 3, an input terminal of the battery charging controller is connected to the solar photovoltaic panel, and an output terminal is connected to the battery. The battery, the storage device, a the front drive motor, the rear drive motor, the infrared sensor, the color sensor, the front arm drive motor, the auxiliary arm drive motor, the touch sensor, the signal receiver, the LED the tilt sensor, the head drive motor and the micro camera are all connected to the CPU controller. The battery supplies power to each component through the CPU controller.

The tilt sensors are installed on the head frame so that the electronic guide dog can always maintain a balanced state to prevent rolling over. The solar photovoltaic panel adopts the polysilicon photovoltaic panel to collect solar energy in the environment and convert it into electrical energy; which reduces dependence on electric energy, reduces emissions and saves energy. Current passes through the battery charging controller and enters the battery. The battery charging controller is SMP40A. The input terminal of the battery charging controller is connected to the solar photovoltaic panel. The output end is connected to the battery. The battery charging controller protects the battery and cuts off the current when the battery is full to prevent damage. The battery supplies the storage device, the front drive motor, the rear drive motor, the infrared sensor, the color sensor, the front arm drive motor; the auxiliary arm drive motor, the touch sensor, the signal receiver, the LEI) light, the tilt sensor, the head drive motor and the micro camera through the CPU controller, wherein the CPU controller can be, but is not limited to, an ATMEGA8 controller. An input terminal of the CUP controller is connected to the infrared sensor, the color sensor, the touch sensor, the signal receiver, the tilt sensor and the micro camera; and an output terminal is connected to the storage device, the front drive motor, the rear drive motor, the front arm drive motor, the auxiliary arm drive motor; the LED light and the head drive motor. The infrared sensor can sense the obstacle ahead and transmit a signal to the CPU controller. The infrared sensor can be a GP2Y0A02YK0F infrared sensor. The color sensor identifies the color of the red indicator light on the ground and transmits a signal to the CPU controller. The color sensor can be CZ-V21AP, and the touch sensor can be P08SB-A. The tilt sensor detects posture changes of the electronic guide dog and transmits a signal to the CPU controller. The tilt sensor may also be replaced with a gyroscope, wherein the gyroscope can be a six-axis digital gyroscope MPU- 6050. The micro camera can be YD-N134CMEXP4, and the storage device can be STK11C68-C35I. The CPU controller can control working states of the front drive motor; the rear drive motor, the front arm drive motor and the auxiliary arm drive motor, and control a switch state of the LED light.

In summary, the present invention provides an electronic guide dog that provides a better life experience for the blind.

What is claimed is:

1. An electronic guide dog, comprising: a main frame, front drive wheels disposed on both sides of a front portion of the main frame, and rear drive wheels disposed on both sides of a rear portion of the main frame, wherein the front drive wheels and the rear drive wheels are connected to the main frame through front arms and rear arms, respectively; wherein the electronic guide dog further comprises:

a head frame hinged to a front of a top end of the main frame, wherein a signal receiving board is provided on the head frame;

a drive mechanism comprising a rear drive motor for driving the rear drive wheels;

a swivel obstacle avoidance mechanism comprising an infrared sensor provided on a front side of the main frame; and a left front drive motor and a right front drive motor for driving the front drive wheels;

an identification braking mechanism comprising a color sensor provided at a bottom end of the main frame;

a front arm swing mechanism comprising two front arm drive motors for adjusting inclination angles of the two front arms; and an auxiliary support mechanism comprising an auxiliary arm mounted on a rear side of the main frame; an auxiliary wheel rotatably mounted on the auxiliary arm, and auxiliary arm drive motors for adjusting an inclination angle of the auxiliary arm.

2. The electronic guide dog, as recited in claim 1, wherein a control box and a dot matrix board are provided on the front and a rear of the top end of the main frame, respectively; a CPU controller is provided inside the control box; an assembly bar is vertically provided at a front end of the main frame; a melody board is provided at the bottom end of the main frame; an assembly board and a solar photovoltaic panel are installed on both a left side and a right side of the main frame, and the assembly board is in front of the solar photovoltaic panel; a battery charging controller and a battery are provided inside the main frame.

3. The electronic guide dog; as recited in claim 2, further comprising a movable handle hinged on both sides of the main frame, wherein the movable handle has a gantry frame structure; the movable handle crosses the main frame, and two free ends of the movable handle are rotatably connected to the assembly board on the left side and the assembly board on the right side of the main body, respectively; the movable handle is also equipped with a touch sensor.

4. The electronic guide dog, as recited in claim 3, wherein assembly holes are drilled on the assembly bar, the assembly board, the movable handle, the front arms and the auxiliary arm.

5. The electronic guide dog, as recited in claim 3, wherein the infrared sensor is mounted on a sensor installing board, and the sensor installing board is mounted on the assembly holes of the assembly bar by bolts.

6. The electronic guide dog, as recited in claim 1, wherein the auxiliary arm is formed by a pair of single arms arranged in parallel; a pair of the auxiliary arm drive motors are symmetrically arranged on the rear side of the main frame, and the two auxiliary arm drive motors are drivingly connected to ends of the two single arms, respectively; the auxiliary wheel is formed by a pair of single wheels arranged in parallel, and the two single wheels are connected by a connecting shaft; the connecting shaft is rotatably installed at an end of the auxiliary arm away from the main frame.

7. The electronic guide dog, as recited in claim 1, wherein the head frame is a frame structure assembled by at least four boards; a signal receiver is mounted on the signal receiving board; at least one LED light is provided on a front side of the head frame, and a protective frame covers the LED light; tilt sensors are installed on both sides of the head frame.

8. The electronic guide dog, as recited in claim 7, wherein the top end of the main frame is further provided with a head drive motor for adjusting an inclination angle of the head frame, and the head drive motor is drivingly connected to the head frame.

9. The electronic guide dog, as recited in claim 1, wherein a micro camera is provided on the head frame, and a storage device is provided inside the control box.

10. The electronic guide dog, as recited in claim 2, wherein a micro camera is provided on the head frame, and a storage device is provided inside the control box.

11. The electronic guide dog, as recited in claim 3, wherein a micro camera is provided on the head frame, and a storage device is provided inside the control box.

12. The electronic guide dog, as recited in claim 4, wherein a micro camera is provided on the head frame, and a storage device is provided inside the control box.

13. The electronic guide dog, as recited in claim 5, wherein a micro camera is provided on the head frame, and a storage device is provided inside the control box.

14. The electronic guide dog, as recited in claim 6, wherein a micro camera is provided on the head frame, and a storage device is provided inside the control box.

15. The electronic guide dog, as recited in claim 1, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

16. The electronic guide dog, as recited in claim 2, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

17. The electronic guide dog, as recited in claim 3, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

18. The electronic guide dog, as recited in claim 4, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

19. The electronic guide dog, as recited in claim 5, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

20. The electronic guide dog, as recited in claim 6, further comprising: a color-changing indicator strip which attached to a ground surface and is located at a starting position of a crosswalk, wherein the color-changing indicator strip is a light indicator strip with red indicator lights uniformly distributed therein; the red indicator lights flash synchronously with a red signal light in the traffic light.

* * * * *